United States Patent
Wiklof et al.

[11] Patent Number: 5,825,995
[45] Date of Patent: Oct. 20, 1998

[54] PRINTER WITH MOTION DETECTION

[75] Inventors: Christopher A. Wiklof; Thomas A. Sweet, both of Everett; Jay Michael Miazga, Marysville, all of Wash.

[73] Assignee: Intermec Technologies, Inc., Everett, Wash.

[21] Appl. No.: 613,325

[22] Filed: Mar. 11, 1996

[51] Int. Cl.⁶ .................................................. G06F 15/00
[52] U.S. Cl. ........................ 395/117; 358/401; 358/472
[58] Field of Search .................................. 395/111, 115, 395/116, 117, 118, 139; 358/400, 401, 473, 496, 472; 382/291, 292, 295, 296

[56] References Cited

U.S. PATENT DOCUMENTS

| | | | |
|---|---|---|---|
| 3,767,020 | 10/1973 | Rowe | 197/1 R |
| 4,372,695 | 2/1983 | Ross | 400/119 |
| 4,427,314 | 1/1984 | Fujiwara et al. | 400/338.2 |
| 4,433,925 | 2/1984 | Fujiwara et al. | 400/88 |
| 4,523,235 | 6/1985 | Rajchman | 358/256 |
| 4,547,780 | 10/1985 | Cummings | 346/9 |
| 4,750,049 | 6/1988 | Murakami et al. | 358/296 |
| 4,819,083 | 4/1989 | Kawai et al. | 358/294 |
| 4,851,896 | 7/1989 | Muranaga et al. | 358/443 |
| 4,851,921 | 7/1989 | Sato et al. | 358/474 |
| 4,862,281 | 8/1989 | Sato et al. | 358/400 |
| 4,887,165 | 12/1989 | Sato et al. | 358/474 |
| 4,894,730 | 1/1990 | Yanagawa et al. | 358/473 |
| 4,899,228 | 2/1990 | Sano et al. | 358/473 |
| 4,903,232 | 2/1990 | O'Connell et al. | 364/900 |
| 4,915,027 | 4/1990 | Ishibashi et al. | 101/486 |
| 4,928,183 | 5/1990 | Yajima | 358/296 |
| 4,947,262 | 8/1990 | Yajima et al. | 358/296 |
| 4,949,283 | 8/1990 | Yamauchi et al. | 364/519 |
| 4,999,016 | 3/1991 | Suzuki et al. | 400/88 |
| 5,020,928 | 6/1991 | Akiyama et al. | 400/193 |
| 5,024,541 | 6/1991 | Tsukada et al. | 400/88 |
| 5,052,832 | 10/1991 | Akiyama et al. | 400/120 |
| 5,079,639 | 1/1992 | Mochinaga | 358/473 |
| 5,112,149 | 5/1992 | Suenaga | 400/88 |
| 5,131,090 | 7/1992 | Fukushima | 395/700 |
| 5,240,334 | 8/1993 | Epstein et al. | 400/88 |
| 5,533,176 | 7/1996 | Best et al. | 395/117 |

*Primary Examiner*—Thomas D. Lee
*Assistant Examiner*—Jerome Grant, II
*Attorney, Agent, or Firm*—Seed and Berry LLP

[57] ABSTRACT

A handheld printer is movable across a target object to print while moving in a desired printing field. The printer has a position detector and a microprocessor controller for detecting the position of a printing member and activating the printing member at a plurality of successive printing locations. The printer may use thermal or inkjet printing and has user feedback and input. A mechanical position detector enables the printer to be used without a mechanical paper drive mechanism. The printer allows image rotation under control of a four-position switch and scaling of the image using distance and printline based scaling. The printer may be controlled by an external controller through a cable or a remote signal source. An alternative embodiment of the printer uses a vacuum-type arrangement to attract and hold the printer to the surface being printed. The printer may be line or battery-powered. The printer scales the image according to a user-selected scaling factor or in response to a measured printing field.

16 Claims, 13 Drawing Sheets

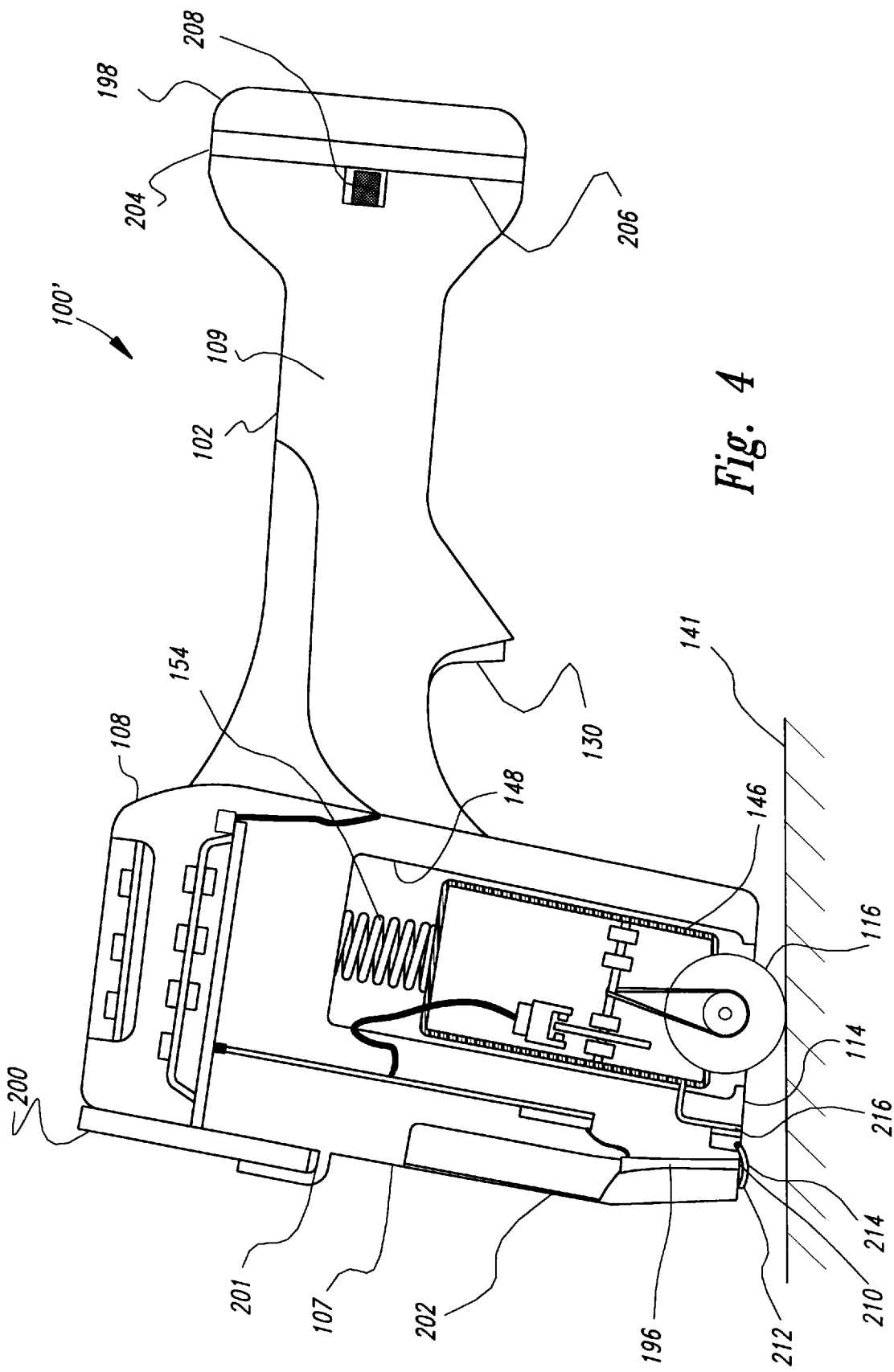

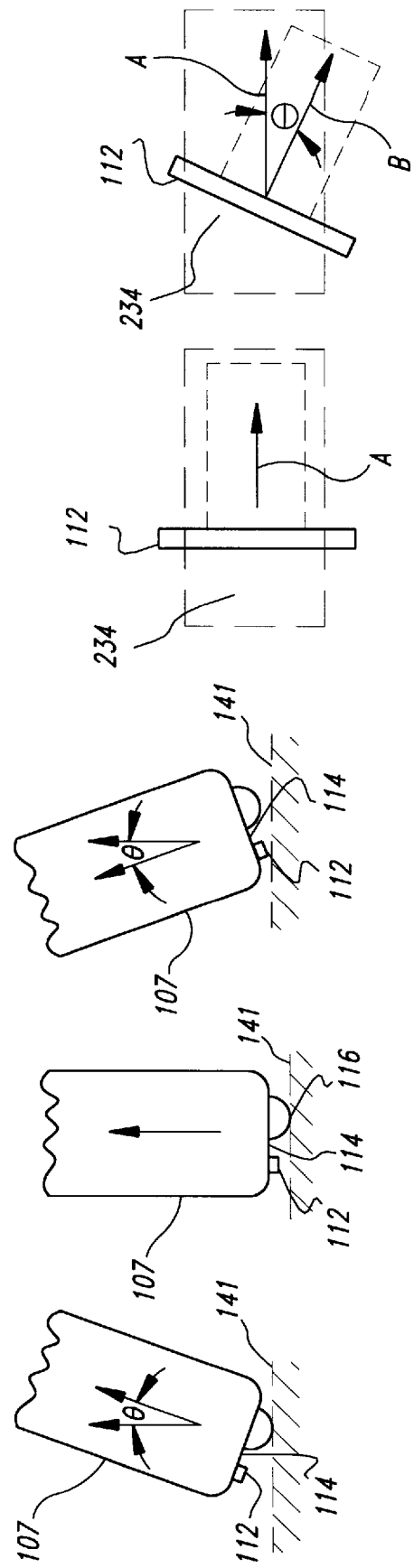

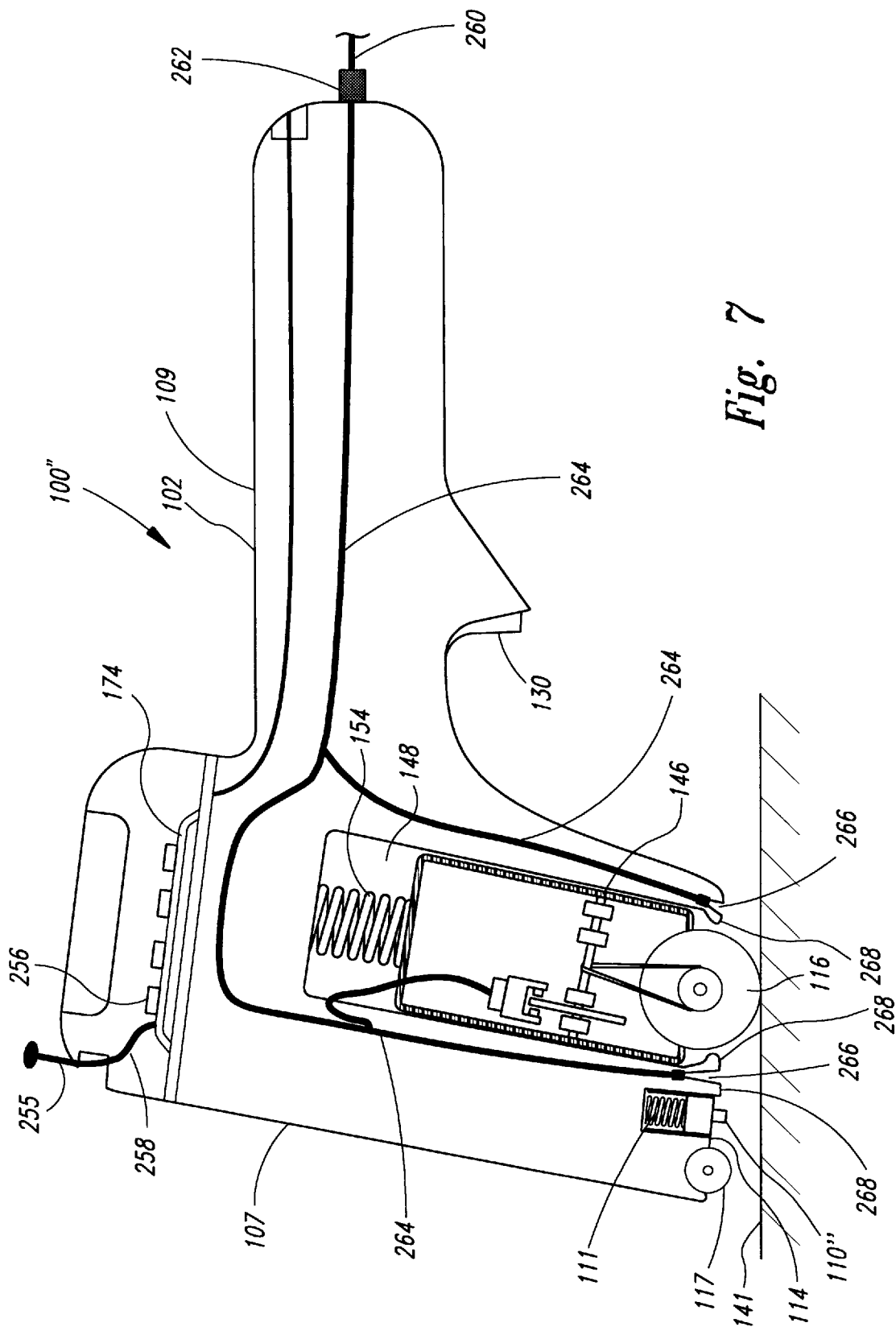

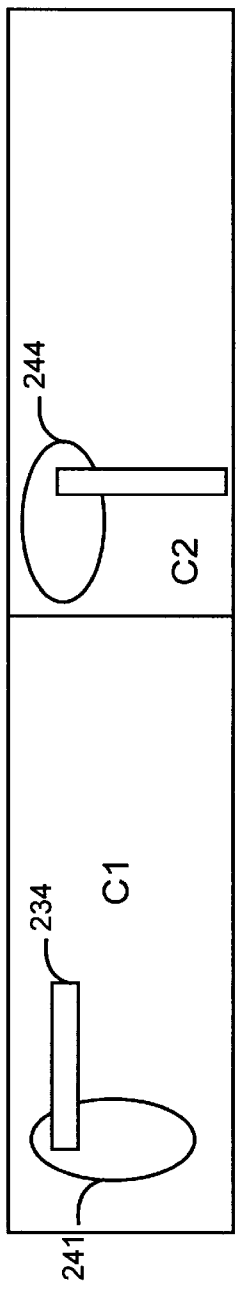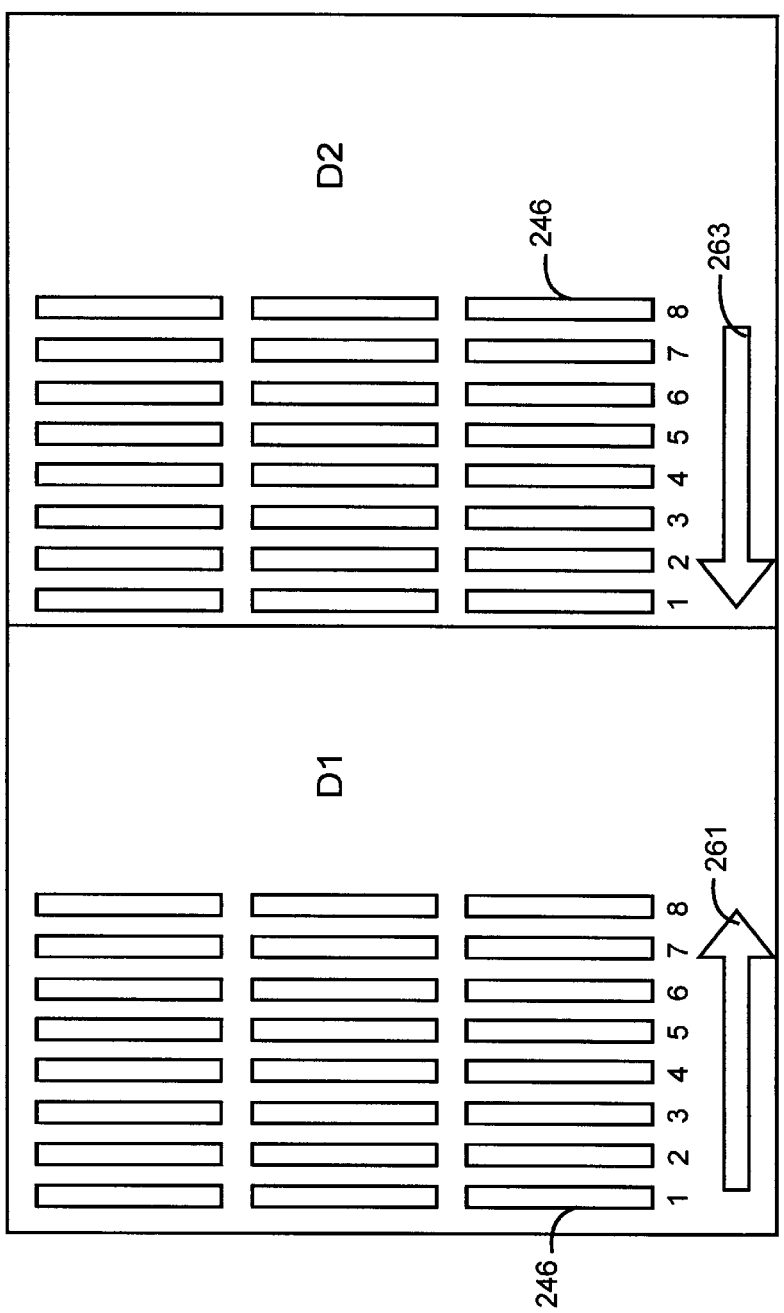

| print rotation | print direction | Image bit-map alignment | Image bit-map read direction | Image line load direction |
|---|---|---|---|---|
| A1 | B1 | C1 | D1 | E1 |
| A2 | B1 | C2 | D1 | E1 |
| A3 | B1 | C1 | D2 | E2 |
| A4 | B1 | C2 | D2 | E2 |
| A1 | B2 | C1 | D2 | E1 |
| A2 | B2 | C2 | D1 | E1 |
| A3 | B2 | C1 | D1 | E2 |
| A4 | B2 | C2 | D1 | E2 |

FIG. 14

PRINTER WITH MOTION DETECTION

TECHNICAL FIELD

The present invention relates to printers for direct printing on target objects.

BACKGROUND OF THE INVENTION

Typically, printers require a supply of print media, such as paper or labels, to be loaded into the printer and controllably fed through the printer to a printhead. An image is printed on the print media as it travels past the printhead in a controlled fashion. A controllably movable print medium is required because this is the only way to accurately control the position of an image being printed on the print medium. Often, the print media is used simply to facilitate the placement of a printed image on an object. For example, bar codes are often printed onto adhesive-backed labels and the printed labels are then attached to packages. Labels are generally used to enable accurate positioning of the print surface relative to the printhead during printing. Then, the label is removed from the printer, positioned on the object and attached to the object. Increases in cost and efficiency would be achievable if bar codes could be printed directly on a target object without using a label.

One handheld instrument for printing directly upon objects is the common ink stamp. In some embodiments, such as in a grocery store price stamp, such stamps may present a repeatable row of data which the user can vary in a limited fashion between stampings. A more sophisticated version of a single-line printer is described in U.S. Pat. No. 4,699,052 issued Oct. 13, 1987 to Lemelson. The patent describes an electronically controlled handheld printer capable of printing a line of text. While the Lemelson device provides some increased flexibility over an adjustable ink stamp, it is limited to a finite printing area and a single line of text. Further, the size of the printer image is limited to the size of the printing element.

One approach to overcoming some of these limitations is presented in U.S. Pat. No. 4,851,896, to Muranga et al., and U.S. Pat. No. 4,862,281, to Sato et al. Muranga and Sato describe manually swept copiers, including a manually swept printing portion. The Sato and Muranga devices print images representing data stored in a memory at a predetermined scale and orientation. Because these devices print images in a fixed orientation relative to the motion of the printer, the entire printer must be rotated to print images at various orientations. Also, because the printers do not enlarge or reduce images, the size of their output images is not easily varied.

SUMMARY OF THE INVENTION

The present invention overcomes the limitations of the prior art by providing a printer capable of printing relatively complex images of indefinite and variable size and a high degree of uniformity directly onto target objects. The printed image achievable with the printer is not limited in size to that of the printing member, which is typically a fixed array of printing elements. The printer eliminates the need for a controllably fed paper source with its associated weight, complexity, cost and interface and processing requirements.

Because the printer uses an accurate, location-based printhead activation, it provides a uniform, repeatable image. The printer can therefore be used to print bar codes and other images of varying lengths, including graphic images. The printer can reduce or increase the size of the printed image and can rotate the printed image to a variety of orientations relative to the direction in which the printer is moved. A four-position switch allows a user to select a print orientation relative to the motion of the printer. The image size may be increased or decreased by varying intervals between successive printlines and varying the number of times each printline is repeated.

The printer may be moved by hand, or driven by a mechanical device. Alternately, the printer may be fixed, and the target object may be moved past the printer independent of control by the printer. For example, the printer may be placed in a table across which target objects are slid, or beside a conveyor transporting target objects. The printer may be activated by a user-operated trigger switch in a consent configuration.

The printer in its preferred embodiment determines its position mechanically using a roller coupled to a rotational sensor. The printhead is energized in response to the detected position to print the image.

To improve the accuracy of the mechanically determined position coordinates and to limit misalignment, the roller is an elongated cylinder which resists lateral slippage. Alternatively, the printer can use a narrow wheel or may employ an optical position sensor.

Because the printer detects its position relative to the target object, and prints directly onto the target object, no mechanical paper drive or other controllable print media feed source is required. This also eliminates the need for a printer-to-paper drive interface.

The printer can also adjust for surface irregularities. This is achieved in the preferred embodiment by flexibly mounting a position detection module in the printer. In an alternative embodiment, the printhead is also flexibly mounted to provide further accommodation for uneven target object surfaces.

The printer can receive printing data and instructions from an electrical line connection, from a data module or through a remote receiver. Such printing data and instructions may include printing characteristics, data to be printed or other printing information. The printing data and instructions may be stored in a memory within the printer or used directly by the printer. The printing data and instructions may also be supplemented by additional operating data, such as printing schedules or controlling data, stored within a separate memory in the printer. Alternatively, data to be printed may be entered through an integral keypad or by scanning coded instructions.

In one embodiment, the printer is capable of improving its contact with the target object by using a vacuum. Alternatively, a magnet may be used.

To prevent misalignment, the printer employs a three point contact.

In one embodiment, the printer includes a trigger to enable printing, a safety switch to inhibit printing when not in contact with a surface, a format orientation selection means, "x-out" selection means, an LED "ready-to-print" indicator, and an LED "overspeed" indicator.

BRIEF DESCRIPTION OF THE DRAWINGS

FIG. 4 is a cross-sectional side elevational view of a first alternative embodiment of the printer of FIG. 1.

FIGS. 5a–5c are schematic representations of printing printers at various angles and associated angle indications.

FIGS. 6a–6b are schematic representations of printing printers at various angles and associated angle indications.

FIG. 7 is a cross-sectional side elevational view of a second alternative embodiment of the printer of FIG. 1.

FIG. 10 is a diagrammatic representation of a bitmap sharing the orientation of data representing an image in the memory of the printer of FIG. 1.

FIG. 11 is a representational view of a bitmap data structure in memory representing the bitmap of FIG. 10 indicating order of loading image lines.

FIG. 14 is a table summarizing correspondences between print rotation, printing stroke direction, bitmap loading direction, and image line loading direction, as shown in FIGS. 9A, 9B, 10, 11 and 12.

DETAILED DESCRIPTION OF THE INVENTION

Figure 1:
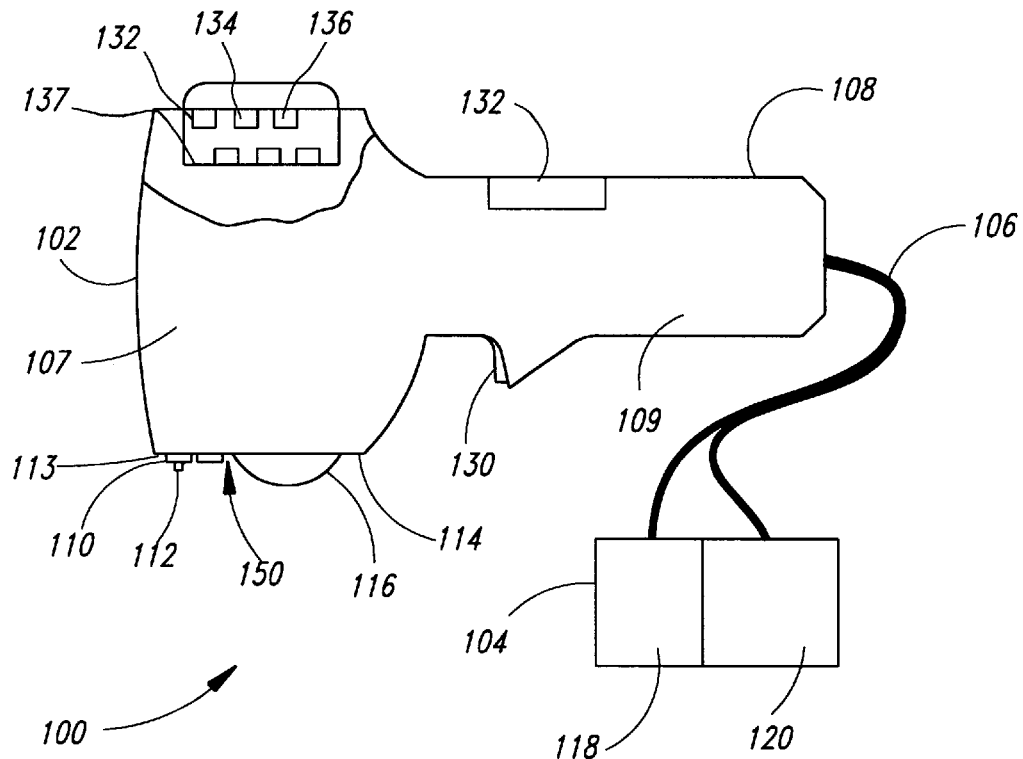
FIG. 1 is a side elevational view of a preferred embodiment of a printer according to the present invention.

A handheld mobile printer 100 according to the present invention is shown in FIG. 1. In this preferred embodiment, the mobile printer 100 has a handheld portion 102 and a separate controller module 104 connected by a connector cable 106. The handheld portion 102 has a housing 108 with a head portion 107 having a printing face 114 and a handle 109 which is preferably ergonomically designed for ease of grasping and control by the hand of a user. A trigger button 130 is positioned on the handle 109 for actuation by the user. While the handle 109 of the illustrated embodiment is adapted for holding by a human hand, the printer 100 can be designed for attachment to a moveable mechanical arm.

A rotatable cylindrical roller 116 and thermal printhead 110 are mounted in the head portion 107 of the housing 108 at the printing face 114. The roller 116 is rotatably mounted with a portion of the roller 116 protruding from a roller aperture 150 in the printing face 114. The thermal printhead 110 is mounted with a row of thermal printing elements 112 exposable at the printing face 114 through an opening 113 in the printing face 114. The thermal printhead 110 is preferably a conventional edge-type thermal printhead.

In operation, a user grasps the handheld portion 102 by the handle 109 and passes the head portion 107 over a target object with the roller 116 rollably engaging the surface of the target object and the trigger button 130 depressed to activate the printhead 110 for printing. When the head portion 107 is passed over the target object with the roller 116 in rolling contact with the target object, the printing face 114 is facing toward the target object and the thermal printhead 110 comes into thermal contact with the target object. When the user depresses the trigger button 130, printing is enabled as will be described below, and the thermal printhead 110 is energized as it passes successive printing locations. This causes heating of the printhead 110 and corresponding heating of the printing location on the target object in a predetermined heating pattern. The heating of the printing location activates a thermally sensitive ink on the target object and produces a desired printed image.

The controller module 104 contains a printer controller 118 and a power source 120. In the preferred embodiment, the power source 120 is a battery pack. However, the power source 120 may alternately use line power.

Figure 2:
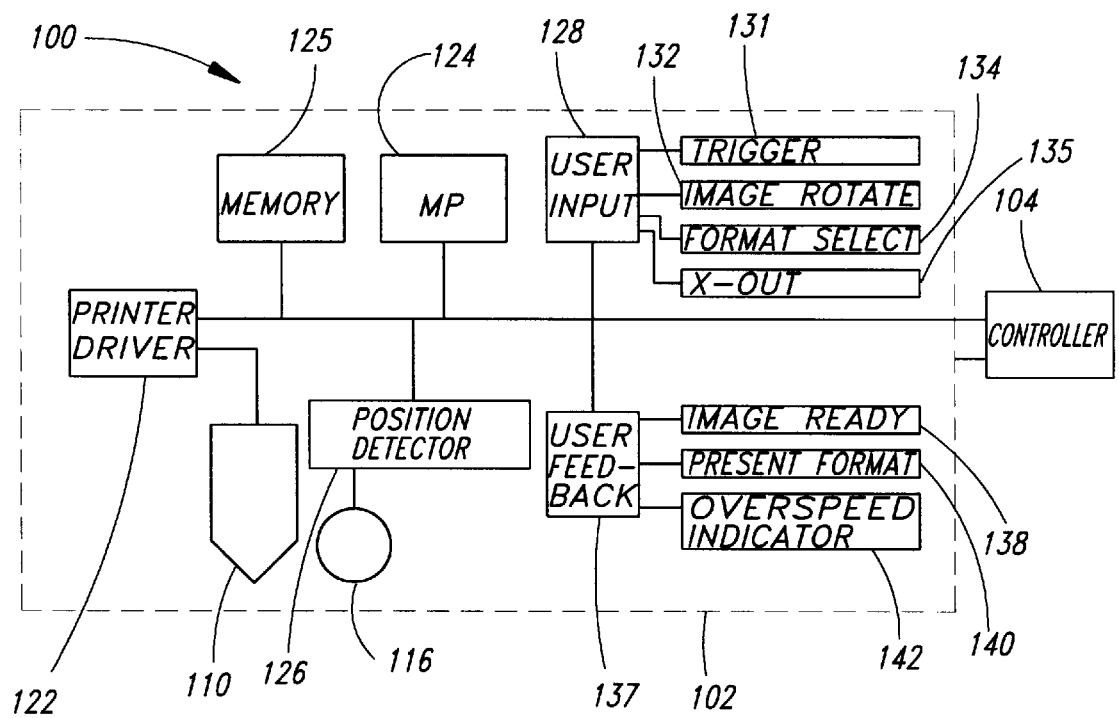
FIG. 2 is a schematic representation of the printer of FIG. 1.

A schematic representation of the printer 100 of FIG. 1 is shown in FIG. 2 with the components carried within the handheld portion 102 being outlined by a broken line. In the handheld portion 102, the printhead 110 is energized using a conventional printer driver 122 controlled by a microprocessor 124. In the thermal printhead 110 of the preferred embodiment, the printer driver 122 contains current drivers driven by a signal supplied by the microprocessor 124 in combination with a system clock and additional logic components in accordance with conventional design.

The microprocessor 124 receives information concerning the position and/or velocity of the handheld portion 102 from a position detection module 126 which is operatively connected to the roller 116. The position detection module 126 includes a rotational detector 160 (as will be described in connection with FIG. 3) which converts the rotational movement of the roller 116 into a digital electrical signal for input to the microprocessor 124.

The microprocessor 124 also receives data from a printer memory 125 and may also receive input from a user through a user input interface 128 (best seen in FIG. 3) such as a keyboard or similar unit. The user input interface 128 transfers signals from a user operable image rotation four-position switch 132, a trigger switch 131 engaged by the trigger button 130, an "X-out" switch 135 and a user operable format select switch 134 to the microprocessor 124.

The four-position switch 132 allows the user to select an orientation for the printed image independent of the direction the handheld portion 102 is passed by the target object, as discussed below with respect to FIGS. 9A–13. Such a capability is useful for printing markings on packages which are presented to a user with a non-uniform orientation, such as boxes in a warehouse. By selecting the appropriate orientation of the four-position switch 132, the printer 100 can be passed by target objects in either the left-to-right or the right-to-left direction without having to adjust the orientation of the target object to achieve the printing of all images with the desired orientation of target objects. Alternatively, the four-position switch may be constructed to allow "up" to correspond to either of the other two cardinal directions in the printing plane.

The X-out switch 135 allows the printer to be used to overwrite existing images on the target object. When the X-out switch is actuated, the printer prints a repetitive pattern such as a band of Xs, thereby obscuring any existing image on the target object.

The microprocessor 124 also receives printing data, instructions and/or other signals from the controller module 104. Printing data from the controller module 104 may be used directly by the microprocessor 124 or may be stored in the printer memory 125. Instructions may also be used directly by the microprocessor 124, such as to set printing formats or to select scaling factors as described below with respect to FIG. 16. Instructions may also be stored in the printer memory 125 for later use by the printer 100. Other signals from the controller module may include a system clock, strobe signals, and/or various other signals not provided by the microprocessor 124 or its related components.

In addition to storing printing data and instructions, the printer memory 125 also contains device parameter data, data for controlling the printer driver 122, and/or other data useful for operating the printer 100. This data may be loaded into the printer memory 125 prior to use, or may be stored permanently in a portion of the printer memory 125 configured as a Read-Only Memory (ROM) using known components.

A user feedback capability is provided by a user output interface 137 which includes a "ready-to-print" indicator 138, a present format indicator 140, and an "overspeed" speed indicator 142. In the preferred embodiment, the image ready indicator 138, the present format indicator 140, and the speed indicator 142 are light-emitting diodes ("LEDs"). Other types of indicators, such as LCDs, may also be used to provide feedback to the user. Though only the three indicators are described with respect to the preferred embodiment, other indicators may be used for differing applications. For example, if the printer is to be used to print bidirectionally, a left/right indicator may be added. Several other feedback indicators, such as a low-power indicator, may also be included. The various indicators are controlled by the microprocessor 124 and related components through the user output interface 137.

The trigger switch 131 is preferably configured as a "consent" switch activated by the trigger button 130. That is, activation of the trigger switch 131 by the trigger button 130 by a user is a necessary but not sufficient condition for printing by the printhead 110. This prevents accidental activation of the printhead 110 without an additional action being taken to allow an alternate condition to be imposed upon printing. For example, it may be desirable to inhibit printing unless the roller 116 is engaged with a surface, or to inhibit printing if the printhead 110 is not aligned with an appropriate mark or surface. In such a case, printing would be inhibited unless both (a) the trigger button 130 is depressed and (b) the printhead 110 is in an appropriate position or condition.

Figure 3:
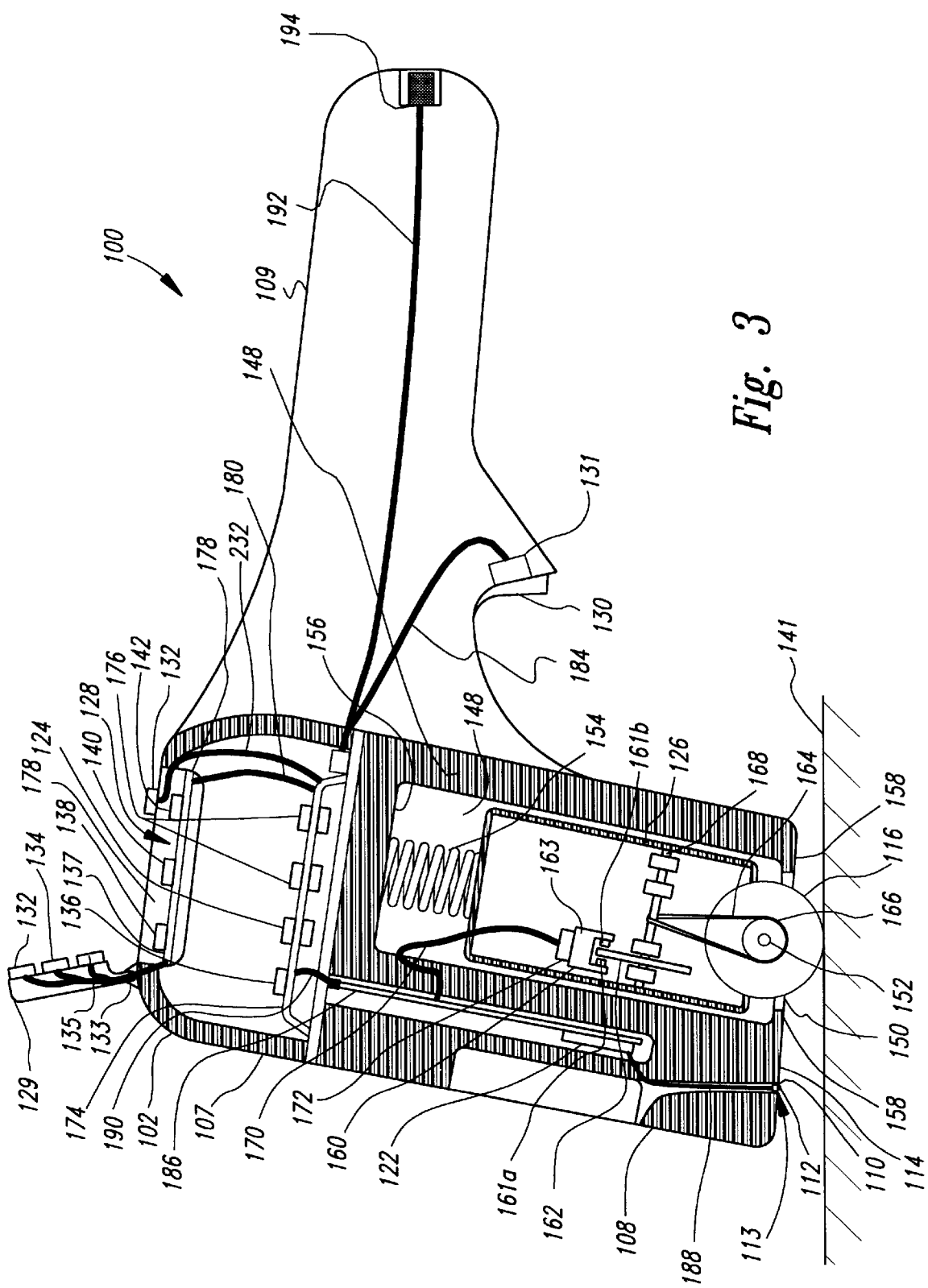
FIG. 3 is an enlarged, cross-sectional side elevational view of the printer of FIG. 1 with a feedback module rotated to an open position.

FIG. 3 shows the handheld portion 102 partially cut away to reveal the position detection module 126 and the position of several of the elements described above. In this view, a cover 129 carrying the four-position rotation switch 132, X-out switch 135 and format select switch 134 is rotated about a hinge 133 to reveal the user input interface 128 and make the switches 132, 134 and 135 accessible for actuation by a user.

The position detection module 126 is slidably mounted in a module cavity 148 within the head portion 107 and carries the roller 116. The roller 116 is rotatably supported by the position detection module 126 on an axle 152. The position detection module 126, and hence the roller 116, are biased toward an outward position with the roller protruding from the roller aperture 150 in the printing face 114 by a bias spring 154 positioned between an inner wall 156 of the module cavity 148 and the position detection module 126. The position detection module 126 is retained within the module cavity 148 by a lip 158 of the housing 108 surrounding the roller aperture 150. Other types of biasing arrangements, such as mounting on a flexible arm or gravitational biasing, will be readily apparent to those skilled in the art. Also, a fixed, inflexible mounting may be used.

The roller 116 preferably has a cylindrical outer surface adapted to frictionally engage the surface of a target object 141, such as a package, on which it is desired to print an image such as a bar code or other machine-readable symbology, graphics or text. Because the roller 116 has a substantial length and a frictional outer surface, it tends to roll in a straight-line path, resisting rotational or lateral slippage, permitting the printing position of the printhead 110 to be determined accurately, as will be described below, and limiting angular misalignment of the printed image. The flexible positioning permitted by the bias spring 154 compensates for non-uniformity of application pressure by a user and for surface irregularities of the target object 141. Where alignment of the printhead 110 is more critical or surface irregularities are sufficiently large, a printhead 110" may also be flexibly mounted, such as shown in an alternative embodiment of FIG. 7. The flexibly mounted printhead 110" employs a separate printhead bias spring 111, or may alternately be mounted directly to the position detection module 126 for movement therewith.

Referring again to FIG. 3, as the printer 100 is pressed into contact with the target object 141, the roller 116 resiliently engages the target object, compressing the bias spring 154. As the printer is moved relative to the target object, the roller 116 is rotated accordingly. Rotation of the roller 116 is converted into an electrical signal in a manner known in the art. In the preferred embodiment, this is achieved by a rotational detector 160 which detects the rotation of an encoder wheel 162 mounted on an encoder shaft 168 and an optical detector 163. Rotation of the roller 116 is transmitted to the encoder shaft 168 through a belt 164 to produce corresponding rotation of the encoder wheel 162. The belt 164 is positioned on a pulley 166 attached to the roller 116 for rotation therewith. Other methods of translating the rotation of the roller 116 into the rotation of the encoder wheel 162, such as gears or mounting to a common axle, will be readily apparent to those skilled in the art.

The encoder wheel 162 has a series of alternately transmissive and opaque radial areas evenly spaced circumferentially around the wheel. The optical detector 163 includes an optical source 161a and pair of optical receivers 161b with the encoder wheel 162 positioned between the optical source and receiver pair such that as the roller 116 moves an incremental distance, successive transmissive and opaque areas of the encoder wheel pass between the optical source and receiver pair. The optical detector 163 outputs a signal corresponding to the angular rotation of the encoder wheel 162 which corresponds, in turn, to the distance traveled by the roller 116 with transitions in the signal corresponding to fixed increments of motion. The rotational detector 160 thus produces an electrical signal indicative of the rotation and/or rotational velocity of the roller 116 for input to the microprocessor 124 via a position signal line 170. Such rotational detectors are commercially available devices which produce signals appropriate for input to the microprocessor 124. Other devices and methods for producing an electrical signal indicative of position and/or velocity of the roller 116 will be readily apparent to those skilled in the art.

While the roller 116 has been shown and described as a cylindrical roller, alternate mechanical elements can be used to orient the printer 100 with respect to the target object and/or to provide a means of measuring the distance and/or velocity of the printer relative to the target object 141. For example, a narrower wheel, belt, or pair of wheels may be advantageous for certain applications.

Electrical components are mounted within the head portion 107 of the housing 108 on a platform 174. Such platforms are well known in the art, and may include metal support brackets and printed circuit boards. Included on the platform are the microprocessor 124 and the printer memory 125. The platform also supports other electronic components 176, such as voltage regulators, transistors, capacitors, and connectors. These are used for generating a stable voltage supply, providing heating current to the printhead 110 and other general functions of the printer 100.

The user feedback module 137 is mounted within a panel cavity 178 of the housing 108 and positioned for viewing by the user when the cover 129 is opened. The user feedback module 137 and the switches 132, 134 and 135 are connected electrically to the microprocessor 124 and related circuitry on the platform 174 using a panel bus 180. Signals from the trigger switch 131 are transferred to the microprocessor 124 and related circuitry over a trigger cable 184.

As discussed previously, the printhead 110 is energized by the printer driver 122 controlled by the microprocessor 124. The printer driver provides electrical current to individual print elements to heat the print elements for a selected time during which the printhead is aligned with successive printing locations to print successive print lines. The printer driver 122 is mounted on an extended platform 186 within the head portion 107 of the housing 108 adjacent to the position detector module 126 to permit it to be positioned close to the printhead 110. The printer driver is connected to the printhead 110 by a printhead bus 188 and is connected to the microprocessor 124 and related circuitry by an extended platform bus 190.

Printing data, instructions and other signals from the printer controller 118 and power from the power source 120 of the controller module 104 are supplied within the handheld portion 102 by a cable 192 which extends through the handle 109 and terminates in a handle input connector 194. The connector cable 106 shown in FIG. 1 is removably attached to the handle connector 194.

FIG. 4 shows a first alternative embodiment of the inventive printer 100' which is of similar construction with the previously described embodiment of FIGS. 1–3. In this first alternative embodiment, however, printing is accomplished using an inkjet-type printhead 196. Ink for the inkjet printhead 196 is supplied by a replaceable ink cartridge 202. Such cartridges are known in the art.

Power to the printer 100' of FIG. 4 is supplied by a rechargeable battery pack 198 which is removably attachable to a butt end 206 of the handle 109 of the handheld portion 102. Such rechargeable battery packs are well known in the art and are used in a wide range of handheld electrical devices. The battery pack 198 may be detached from the housing 108 by depressing a release button 208 to allow replacement with a charged spare battery pack while the discharged battery pack is being recharged.

While the battery pack 198 as shown in FIG. 4 is detachable for recharging, the battery pack may be adapted for recharging while remaining attached to the housing 108. In such a configuration, recharging may be realized through a combination support rack/battery charging station as is common in handheld electrical devices.

The first alternative printer 100' of FIG. 4 does not require attachment to an external controller such as controller module 104 of FIG. 1. Instead, in this embodiment, printing data, instructions and other information are input from a data module 200 which is removably mounted directly to the head portion 107 of the handheld portion 102 using a data module receptacle 201. The data module 200 may be any of a number of data storage media, such as a PCMCIA card. During printing, a user selects an appropriate data module 200 and insert it into the data module receptacle 201. Printing data, instructions and other information from the data module 200 is then used by the printer 100' to generate signals for driving the printhead 196. The result is a "wireless" printer.

Alternatively, the data module 200 may be an internally programmable memory device. Such devices are well known in the art and may include commercially available integrated circuits, floppy disks, or other memory components. Printing data, instructions and other information are then loaded into the internal memory device using a data bus in the manner described with respect to FIG. 3. To preserve the fully portable nature of the printer 100', printing data instructions and other information are loaded into the memory when the printer 100' is not in use. This is achieved by adapting the support rack/battery charging station described above to include a data cable connector (not shown). Such battery recharging and data interface connections are commonly found in notebook computer docking stations which adapt notebook computers to desktop use.

The inkjet printhead 196 utilizes conventional ink jets 210. To prevent problems such as build-up of debris caused by exposure of the ink jets 210, the handheld portion 102 has a retractable cover 212 which covers the ink jets 210 when no printing is in progress. The cover 212 is retracted by a shutter mechanism 214 activated by an extension arm 216 connected to the position detection module 126. In operation, when the roller 116 is pressed against the surface of a target object for printing with sufficient force to overcome the outward bias force the bias spring 154 applies to the roller, the position detection module 126 slides inwardly in the module cavity 148. The extension arm 216 moves correspondingly inward, activating the shutter mechanism 214. The shutter mechanism 214 retracts the retractable cover 212, uncovering the ink jets 210 of the inkjet printhead 196.

Referring again to the printer 100 of FIGS. 1–3, the printer further includes a level/angular detection and feedback capability. For optimal printing, it is desirable that the printing element 112 of the printhead 110 be located an appropriate distance from the target object 141 and be angularly oriented so as to be in alignment with respect to an available printing field 234 such as illustrated in FIGS. 5b and 6a. As illustrated in FIG. 5a, if the handle 109 is tilted too far, with the roller 116 in contact with the target object 141, the head portion 107 will rotate about the axle 152 of the roller (see FIG. 3) and move the printing elements 112 of the printhead 110 too far from the surface of the target object 141 for effective printing. Where a separation between the printhead 110 and the target object 141 is preferred for printing (e.g., with the inkjet printer 100' of FIG. 4), rotation of the printing elements 112 toward the target object 141 as shown in FIG. 5c, is also undesirable.

When printing on a vertical surface of a target object, the handheld printer 100 is optimally passed horizontally (left-right) or vertically (up-down) with respect to the target object. As illustrated in FIG. 6b, excessive rotation of the printer 100 so that it moves in direction B with respect to the desired direction A of movement for the printer to produce a printed image can result in printing of the image outside of an available printing field 234. This may result, for example, in only a portion of an image being printed in the available printing field 234.

To help prevent the occurrence of problems due to angular misalignment of the head portion 107, the preferred embodiment of the printer 100 employs a multiple point contact to maintain the appropriate planar orientation of the printing face 114 relative to the target object 141. In the thermal printhead 110 of the embodiment of FIG. 1, the printhead 110 is permitted to contact the target object 141 to provide a point of contact, in addition to the point of contact provided by the roller 116. The printer 100 is kept aligned with the target object 141 by the continuous contact of both the roller and the printhead with the target object. Alternately, as shown in FIG. 7, the second alternative embodiment of the printer 100" uses a second roller 117 mounted to the housing 108 of the printing face 114 to provide the second point of contact, allowing the printhead 110" to "float" above the target object 141 as shown in FIG. 7 as the printer 100" moves relative to the target object 141.

The printer 100 of FIGS. 1–3 permits both image rotation and bidirectional printing. As shown in FIG. 3, a four-position switch 132 mounted to the head portion 107 allows the user to select rotation of the printed image relative to the orientation of the head portion 107. The four-position switch 132 is a user actuatable switch connected to the microprocessor 124 and electronic components 176 by a cable 232.

Figure 9A:
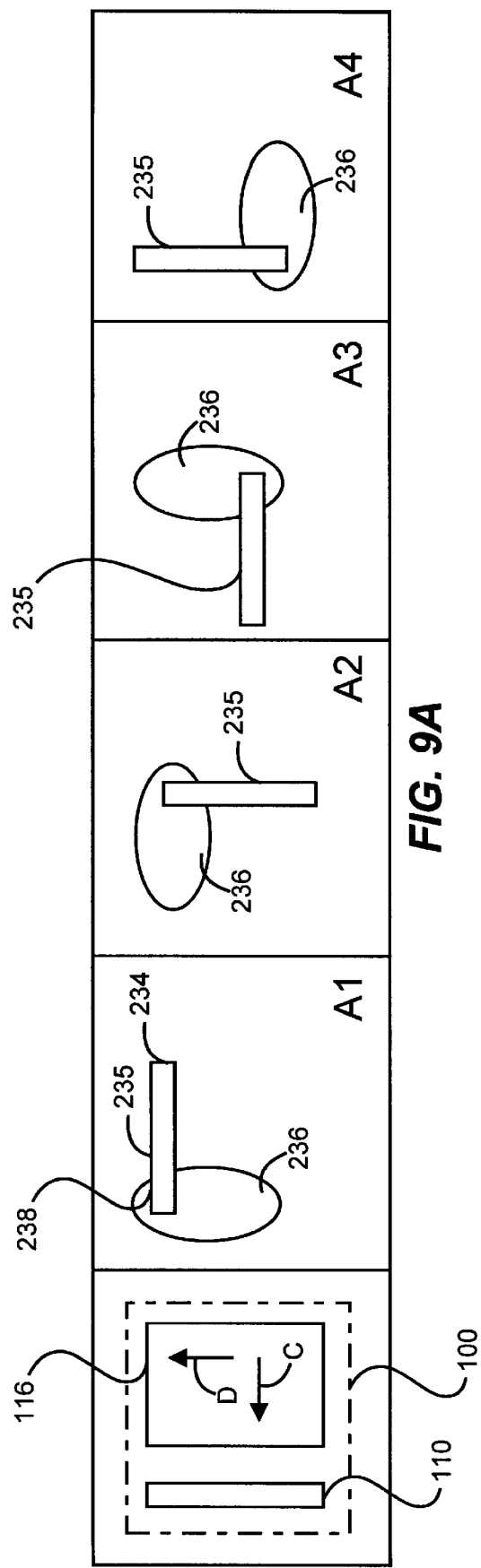
FIG. 9A is a diagrammatic view of an asymmetrical image in four-positions rotated relative to the printhead and roller of the printer of FIG. 1.

In FIG. 9A there are illustrated four separate printed images A1–A4, each being identical to the others except each is rotated successively by 90°. To provide a frame of reference between the images A1–A4 and the printer 100, the printer, including the roller 116 and the printhead 110, is shown schematically to the left of the images A1–A4. It is presumed that the head portion 107 is held in this orientation for printing of all four images A1–A4. As used in the following discussion, "forward" will refer to a direction C of travel of the printer 100 where the printhead 110 leads the roller 116, that is, to the left in FIG. 9A. "Up" will refer to a direction D 90 degrees clockwise of the forward direction C.

It is noted that the particular image used in images A1–A4 is a representative image having an offset rectangular region 235 chosen to show asymmetry about two normal axes (the forward and up directions in FIG. 9A) and an elliptical region 236. With the orientation of image A1, the rectangular region 235 is in the upper right-hand portion of the image and a distal edge 233 is at the right edge of the image. It is noted that use of the four-position switch 132 to rotate the image rotates it relative to the alignment of the head portion 107 of the housing 108, not the direction of travel of the printhead 110.

In a first position of the four-position switch 132, the printer 100 prints the image in the "normal" position as shown as image A1. The image is printed with the orientation of image A1 where the rectangular region 235 is printed in the upper right-hand corner as the printer is moved forward in direction C. In a second position of the four-position switch 132, the printer 100 prints the image with an orientation of image A2 which is rotated by 90° in a clockwise direction relative to the orientation of image A1. In a third position of the four-position switch 132, the printer 100 prints the image with an orientation of image A3 which is rotated by 180° relative to the orientation of image A1. In a fourth position of the four-position switch 132, the printer 100 prints the image with an orientation of image A4 which is rotated by 90° in a counterclockwise direction relative to the orientation of A1.

The printer 100 permits the user to select the orientation of the image relative to the head portion 107 and independently of the direction in which the printer 100 is moved. To allow this independence, the printer 100 first detects the initial direction in which the printer 100 is moved. The printer 100 then prints the image in the desired orientation regardless of the direction of the printing stroke.

Figure 9B:
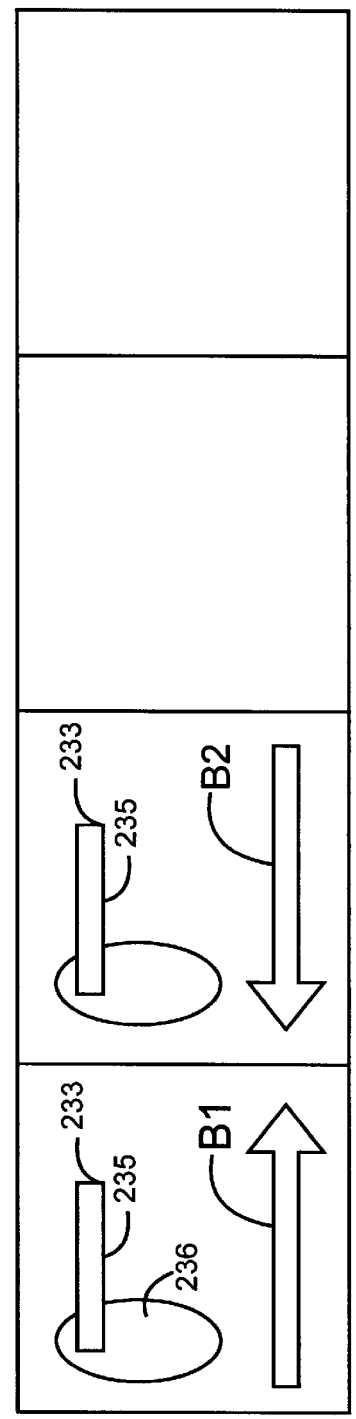
FIG. 9B is a diagrammatic view of printing stroke direction relative to the image in orientation A1 of FIG. 9A.

Referring to FIG. 9B, for a backward printing stroke direction 238 (i.e., where the roller 116 leads the printhead 110, referred to herein as "dragging" or "pulling" the printhead), the printer 100 detects the printing stroke direction and prints the distal edge 234 of the rectangular region 235 last such that the distal edge is at the right edge of the image. Where, as shown in FIG. 9B, the printer 100 is propelled with a printing stroke direction 240 (i.e., the forward direction C of FIG. 9A with the printhead 110 leading the roller 116, referred to herein as "pushing" the printhead), the printer prints the distal edge 234 of the rectangular region 235 first such that the distal edge is still at the right edge of the image.

After the printer 100 determines the printing stroke direction by monitoring the direction of the roller 116, it must further establish the orientation of the image as indicated by the position of the four-position switch 132 as described above. To establish the orientation, the printer 100 controls data flow to the printhead 110. This process will be referred to herein as "image rotation."

Figure 13:
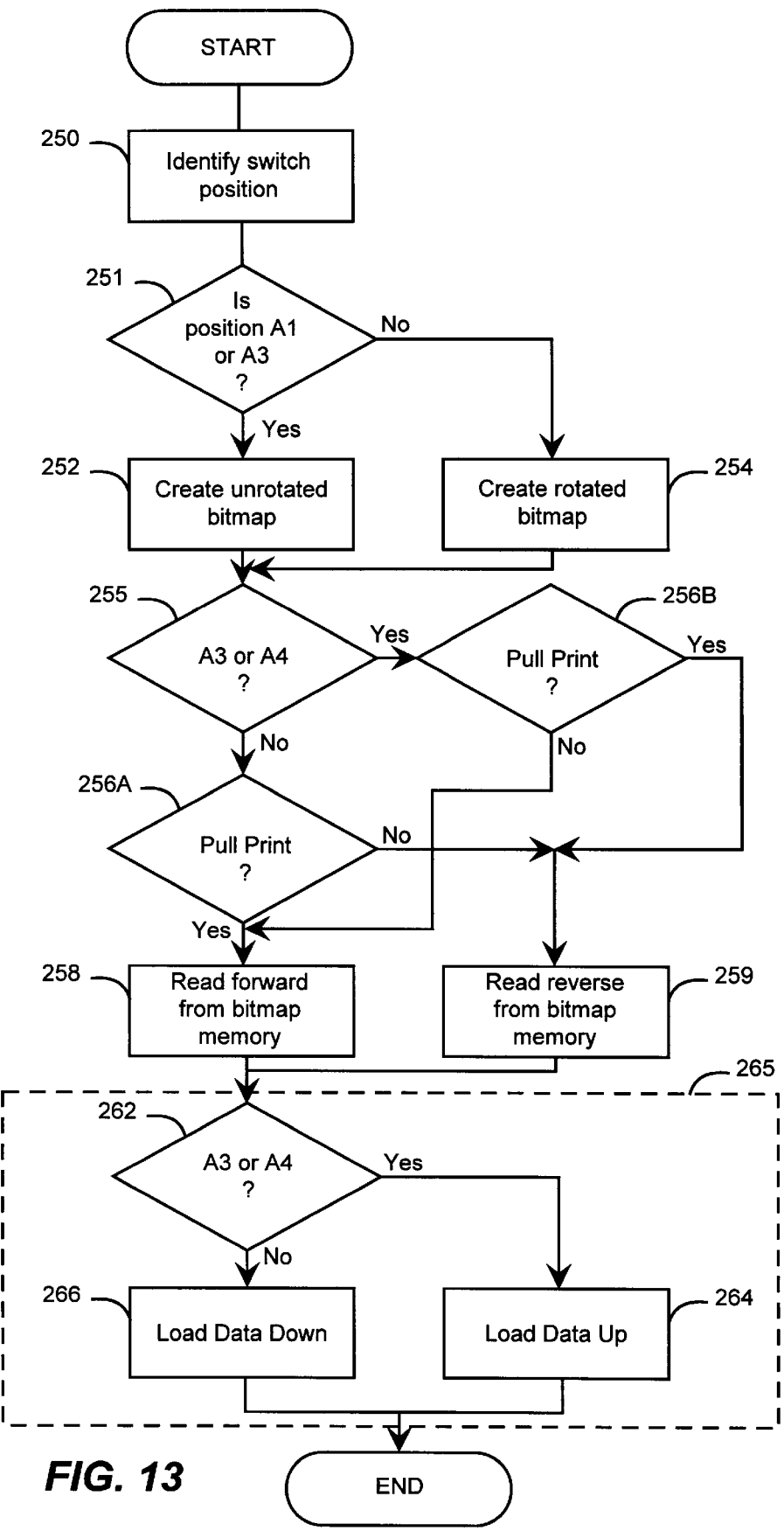
FIG. 13 is a flowchart showing the steps for image selection, rotation and line loading, as shown in FIGS. 9A, 9B, 10 and 11.

Image rotation through control of data flow to the printhead 110 is set forth in the flowchart of FIG. 13. First, the printer 100 determines the switch position of the four-position switch 132 in step 250. In step 251, if the four-position switch is in its first or third position corresponding to orientation of image A1 or A3, then the process passes to step 252 and an unrotated bitmap is created in the memory 125 which corresponds to the selected switch position. The bitmap is a group of data representing the image to be printed. Each bit or group of bits includes data representing a pixel of the image to be printed, with the bits or group of bits having memory locations identified by a corresponding group of memory addresses (a map). Thus, the complete image is represented by a mapped set of bits or groups of bits stored in memory. The map is typically represented by a two-dimensional array of data having discrete rows and columns, with data locations being identified by row addresses and column addresses. As shown in FIG. 11, the structure of a memory portion 246 of the memory 125 can be presented in such rows and columns. Here, three rows and eight columns have been used to represent the structure of the bitmap. It will be understood that significantly larger numbers of rows and columns will typically be used to represent the image in memory.

If the four-position switch 132 is determined to be in the first or third position (selecting the orientation of image A1 or A3), in step 252 an unrotated bitmap C1 (represented schematically in FIG. 10 by an image corresponding to the orientation of image A1) is created in the memory portion 246 of memory 125. If the four-position switch 132 is determined not to be in the first or third position, but rather in the second or forth position (selecting the orientation of image A2 or A4), in step 254 a rotated bitmap C2 (represented by an image corresponding to the orientation of image A2) is created in the memory portion 246. That is, the data is stored according to a map where the row addresses are substituted for the column addresses and the column addresses, in reverse order, replace the row addresses.

Figure 12:
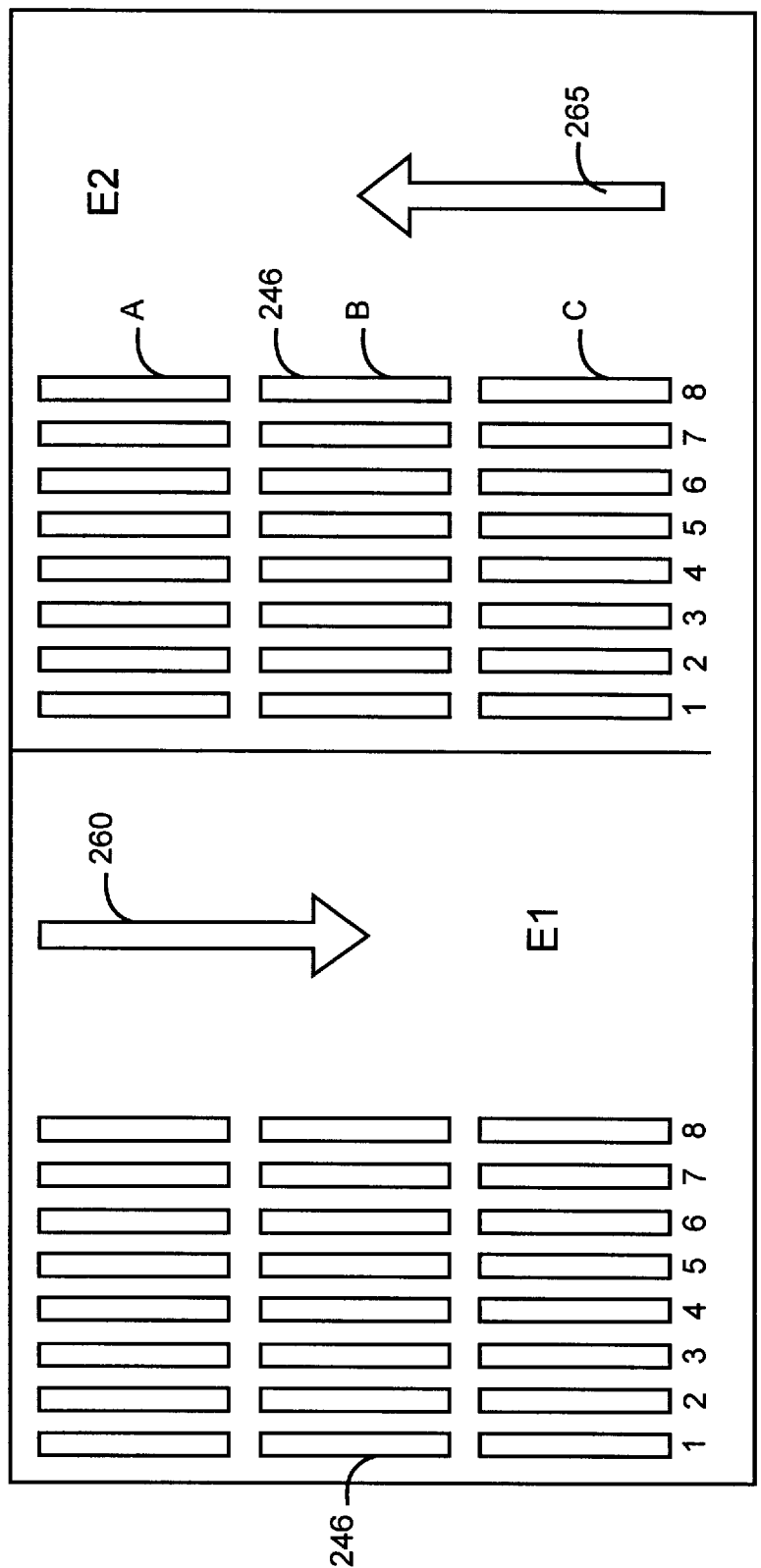
FIG. 12 is a representational view of the bitmap of FIG. 11 indicating direction of loading image lines out of the memory for the images A2 and A4 of FIG. 9A.

Next, in step 255 the printer 100 determines if the four-position switch 132 is in the third or fourth positions. If the four-position switch is in the third or fourth position (i.e., the four-position switch is in the first or second position) in step 255, the following sequence occurs. As the printer 100 moves, the printer 100 then determines from the rotation of the roller 116 if the printing stroke is a push or pull printing stroke in step 256A. If the printing stroke is a pull (i.e., the printer 100 is moved in the printing stroke direction B1 of FIG. 9B), in step 258 the data is read in a first or "normal" reading direction indicated by the arrow 261 in FIG. 11, from the memory portion 246 in which the bitmap is stored. That is, in the representation of FIG. 11, the printer 100 in step 258 reads data sequentially from columns 1–8 as indicated by the arrow 261 to create printlines forming the image. Reading of individual ones of the columns is represented in FIG. 12, which shows the same row and column structure for the memory portion 246 as shown in FIG. 11. To read data from each column, the image is loaded from the memory portion 246 into the printhead in a direction corresponding to the orientation of the printhead 110. That is, the data stored in each column of the memory portion 246 will be read from top to bottom, in the read direction indicated by the arrow 260 in FIG. 12 and transmitted to the printer driver 122 (FIG. 2) to activate the printhead 110. It will be understood that the terms "up" and "down" are not necessarily indicative of the physical locations in which the data are stored or read.

Returning to FIGS. 10, 11 and 12, if in step 256A the printing stroke is determined to be a push stroke (i.e., the printer 100 is moved in the printing direction B2), in step 259 the printer reads data from the memory portion 246 in a reverse reading direction indicated by the arrow 263 of FIG. 11. That is, the printer reads image lines sequentially from column 8 through column 1.

The above description of image rotation and image loading in the memory portion 246 relates to the first and second switch positions (the orientations of images A1 and A2) of the four-position switch 132. An inverse procedure is followed if, in step 255, the four-position switch is in the third and fourth switch positions corresponding to orientations of images A3 and A4. If the four-position switch 132 is in a position corresponding to the orientation of image A3 or A4, in step 256B the printer 100 determines if the printing stroke is a pull or a push. If the printing stroke is a pull, in step 259 data is read from the bitmap (C1 or C2) of FIG. 10 in memory portion 246 in reverse order (arrow 263). If the printing stroke is a push, the data is read from the bitmap (C1 or C2) in memory portion 246 in a normal direction (arrow 261) in step 258 as described above.

If the image is read in reverse (arrow 263) from the memory portion with no other changes, in step 259 a mirror image of the image to be printed will be produced. To achieve the full rotation of the image read in reverse from the bitmap to the orientations of images A2 and A4, the image must also be rotated about the direction of travel of the printer 100. For example, taking the image in orientation A3 and assuming a pull stroke in the printing direction 238 of FIG. 9B, the bitmap C1 is stored in the memory portion 246. If the bitmap C1 is read from the memory portion 246 in reverse order, in step 259 a mirror image (not shown) of the image with the orientation of image A1 would be produced. That is, if no further rotation of the image were performed by the printer, the rectangular region 235 of the image would remain at the top of the image. Thus, in step 262, if the printer 100 determines that the image is to be printed in the orientation of image A3 or A4, additional steps must be taken. To print the image with the orientation of image A3, the rectangular region 235 of the image must be at the bottom. That is, the image must be "flipped" or rotated 180 degrees such that the rectangular region is printed at the bottom of the image about the direction of travel of the printer 100.

To achieve this rotation, the printer loads data from each of the columns 1–8 into the printhead driver 122 in an "up" direction as indicated by the arrow 265 of FIG. 12. That is, data stored in column 8, row C are loaded first. Then data in column 8, row B, are read next. After which, data in column 8, row A, are read next. Next, the data in column 7, row C; column 7, row B; and column 7, row A, are loaded sequentially into the printer driver 122. The same sequence is followed for the remaining columns.

The printing stroke direction detection, image bitmap alignment, image bitmap load direction, and image line load direction (flipping), discussed above, are presented in tabular form in FIG. 14. As shown in the first and second columns, one of four orientations corresponding to images A1–A4 can be chosen with the four-position switch 132, along with each of the two printing directions B1, B2 (as indicated by the arrows 238, 240 of FIG. 9B), to give eight possible combinations. The table presents for each of these combinations of orientation and printing directions, the corresponding representations of FIGS. 10, 11, and 12. For example, for printing in the orientation of image A3 with a printing direction 238 (of FIG. 9B), the image bitmap C1 of FIG. 10 would be used. Data would be loaded in the reverse printing direction 261 of FIG. 11 and each line of data would be loaded in the up direction 265 of FIG. 12.

The printer 100 may also scale images at a selected scaling factor S, where S may be greater than or less than 1. The scaling factor S may be chosen by a user. Alternatively, as discussed below with respect to FIG. 16, the scaling factor S may be determined by the printer in response to a measured length of the available printing field 234 (FIGS. 6a, 6b). The following discussion of the process of scaling of the image, as illustrated in FIG. 15, assumes the user selects the scaling factor S; however, the process will be identical if the printer has selected the scaling factor S automatically, as discussed below with respect to FIG. 16.

Figure 15:
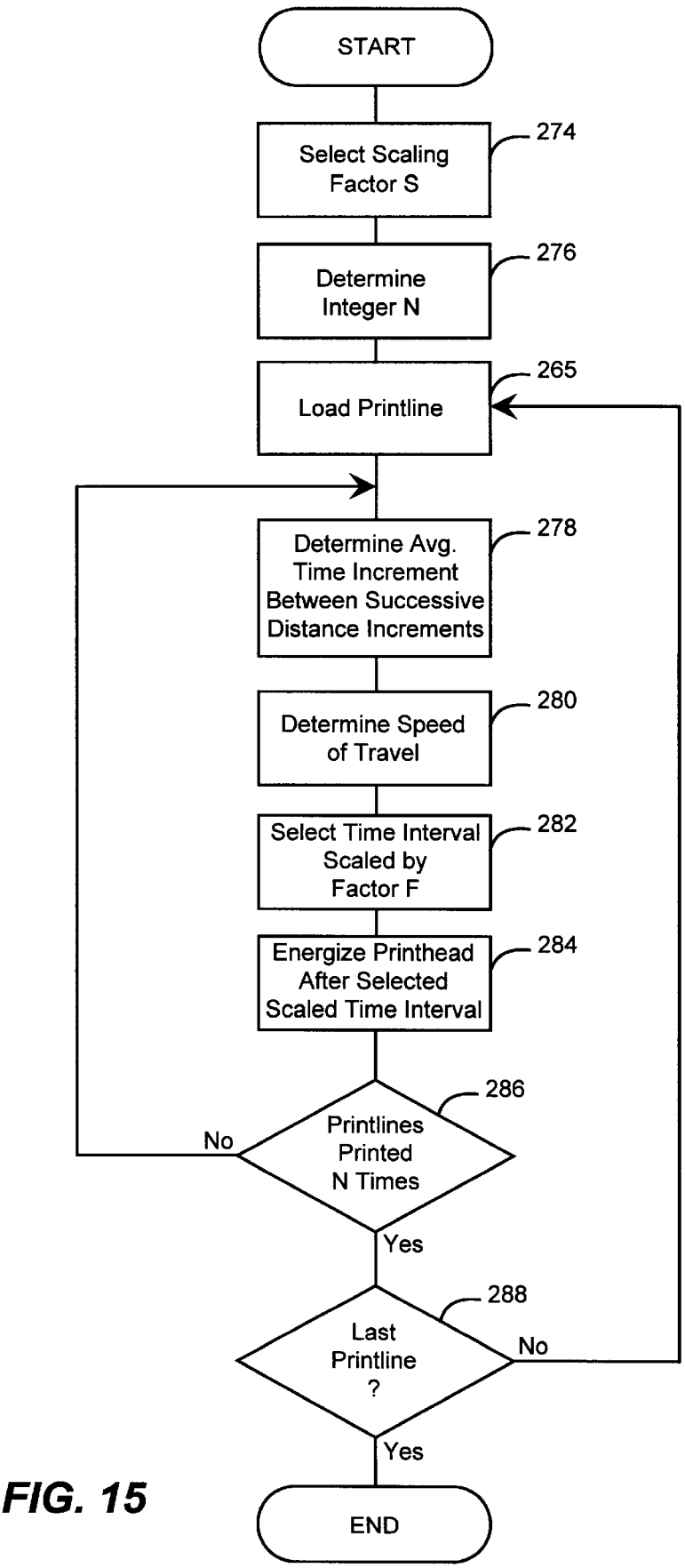
FIG. 15 is a flowchart showing the steps for scaling image size.

After the user selects a scaling factor S in step 274 of FIG. 15, the printer 100 in step 276 determines an integer factor N by which to increase the size of the image. To increase the size of an image by the integer factor N, each line of print represented in the bitmap is loaded into the printer driver 122 in step 265 and will be printed N times as described hereinafter, instead of the usual one time. The scaling factor N is thus based upon the number of times each printline is printed.

Concurrently, the printer 100 reduces the size of the image by a distance based scaling factor F, such that the image is scaled by a scaling factor S where, S=N*F. To reduce the size of the image, the microprocessor 124 changes a distance between successive printlines to produce a distance based scaling factor F.

To realize the image reduced by the distance based scaling factor F, the printer 100 first monitors the signal from the rotational detector 160 to determine an average time lapse between successive increments of motion of the printer relative to the target object 141 in step 278. By detecting the average time lapse between recent signals from the rotational detector 160, the microprocessor 124 can determine a speed of travel of the printer 100 in step 280. In step 282 the printer then selects appropriate time intervals for use between energization of the printhead 110 as portions of the average time between successive increments of motion. This establishes increments of position corresponding to successive printlines of repetitions of a printline. The printer 100 then prints printlines at successive ones of the selected increments in step 284.

For example, where the separation between successive signals from the rotational detector 160 corresponds to a movement of 0.1 mm, the microprocessor 124 will calculate a time interval corresponding to a portion of the 0.1 mm. The printhead 110 is then energized in step 284 to print at the chosen fractional time increments corresponding to the fraction of the 0.1 mm. By decreasing the time increment between successive printlines or repetitions of a printline by the scaling factor F, the microprocessor 124 can decrease the scale by the same scaling factor F.

After the printhead is energized, the printer determines if the printline has been printed N times in step 286. If the printline has been printed N times, the printer determines if there are any more printlines to load in step 288 and, if any remain, loads a new printline in step 265. If the printline has not been printed N times in step 286, the printer repeats steps 278, 280, 282 and 284.

The combination of the printline based scaling factor N and the distance based scaling factor F allows the image to be scaled upward or downward by non-integer values. An increase in the number of times each printline is printed by the printhead 110 based scaling factor N, in combination with a decrease in the distance based scaling factor F, will give the overall scaling of: S=N*F. The scaling factor S is thus both distance based and printline based. The scaling factor S can be a non-integer and can be greater than or less than 1.

Figure 16:
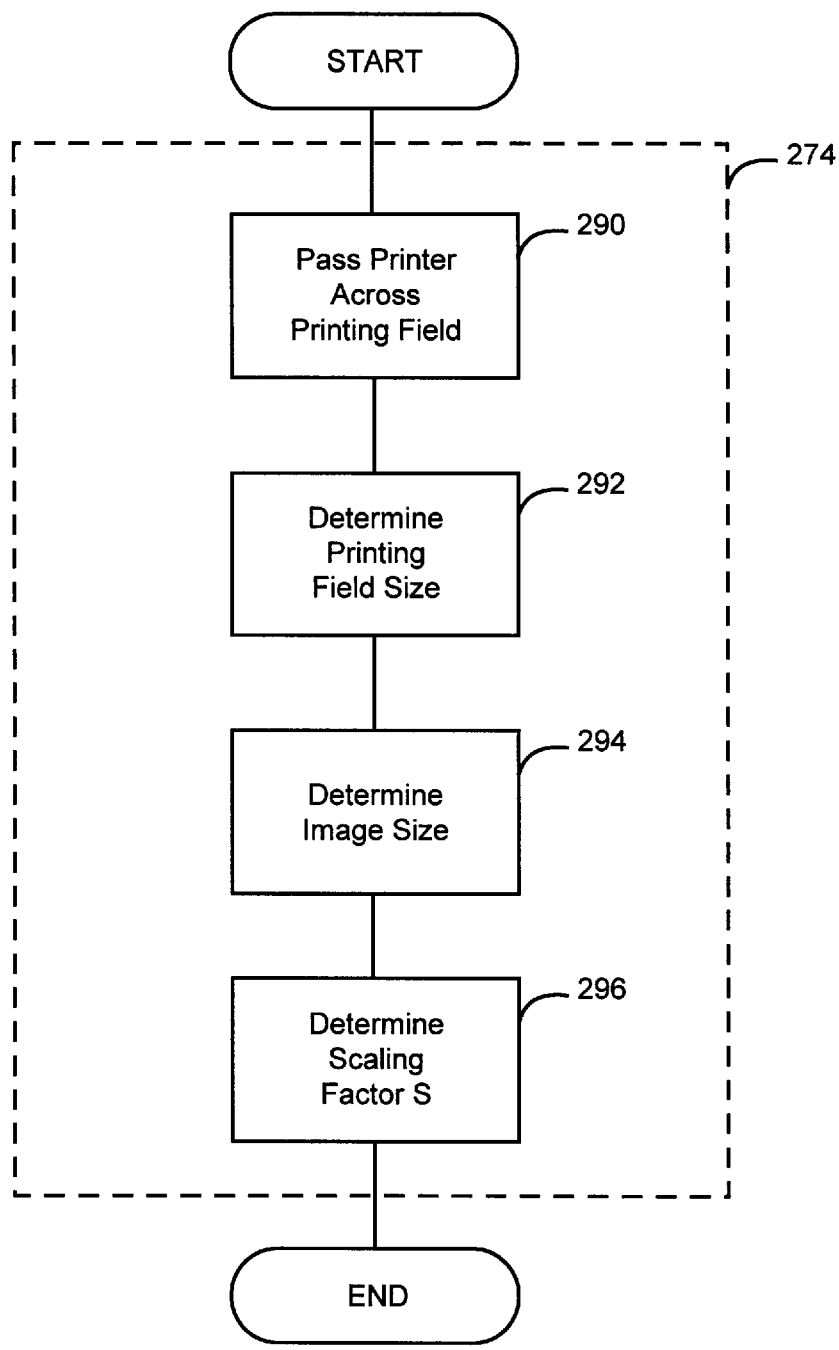
FIG. 16 is a flowchart corresponding to step 274 of FIG. 15 showing the steps for selection of a scaling factor by the printer based upon a measured printing field.

While the above has assumed that the scaling factor S is preselected, the printer 100 can perform the selection of the scaling factor S (step 274 of FIG. 15) to scale an image according to the size of a user-defined printing field 234 using the process illustrated in FIG. 16. To scale an image in response to the user-defined printing field, the roller 116 with the target object 141 and passes the roller across the printing field in step 290. As the printer 100 travels across the printing field, it does not print, but monitors the distance which the printhead travels using the rotational detector 160. At the end of the pass, the microprocessor 124 calculates the distance traveled by the printhead 110 to determine the desired printing field size in step 292. Allowing for a predetermined margin space, the printer determines an appropriate image size for the user-defined printing field in step 294. The microprocessor 124 then calculates an appropriate scaling factor from a nominal image size in step 296 by dividing the determined image size by the nominal image size.

As the printer 100 is passed by the user along a return path over the user-defined printing field, the image is printed at the chosen scale. Thus, in a bidirectional pass the printer can measure a desired printing field, determine an appropriate scaling factor, and print an image at the appropriate scaling factor.

In the previously described second alternative printer 100", shown in FIG. 7, a radio antenna 255 and associated receiver circuitry 256 enables the handheld portion 102 to receive signals from a remotely positioned printer controller 118. A remote receiving capability for the printer 100 may be particularly advantageous in a warehouse situation where printing data instructions, and other information such as inventory counts from a central inventory tracking system must be transmitted to and from warehouse workers at distant locations using the printer. Control of inventory can then be performed from a central location.

Signals received by the receiver circuitry 256 are transmitted to the components mounted on the platform 174 within the head portion 107 of the handheld portion 102 through a cable 258. Return signals from the printer 110 to the remotely positioned controller 118 are transmitted through the antenna 255. While the illustrated receiver circuitry 256 utilizes a radio antenna 255, other structures for communication, such as conventional infrared links, may be used.

In some applications it may be desirable to aid the attraction and hold of the handheld printer 100 to the target object 141 for printing. In the embodiment of FIG. 7, a vacuum assist is used. This feature is particularly useful in applications where some form of assistance is desirable to attract and help hold the printing face 114 adjacent to the target object 141. As shown in FIG. 7, an external vacuum line 260 from an external vacuum source (not shown) is connected to the handheld portion 102 using a vacuum connector 262. An internal vacuum line 264 communicated the vacuum between the vacuum connector 262 through the housing 108 to a pair of vacuum ports 266 at the printing face 114 one forward and one rearward of the roller 116. The vacuum ports 266 are located in surfaces 268 of the printing face 114 which do not contact the surface of the target object 141. Instead, the vacuum ports 266 are positioned to provide a small gap between the printing face 114 and the target object 141, through which air will flow. This constant air flow provides a suction effect, attracting and helping to hold the printing face 114 parallel and adjacent to the target object 141 for printing. Because no actual contact exists, the printer does not "stick" to the surface of the target object.

Figure 8:
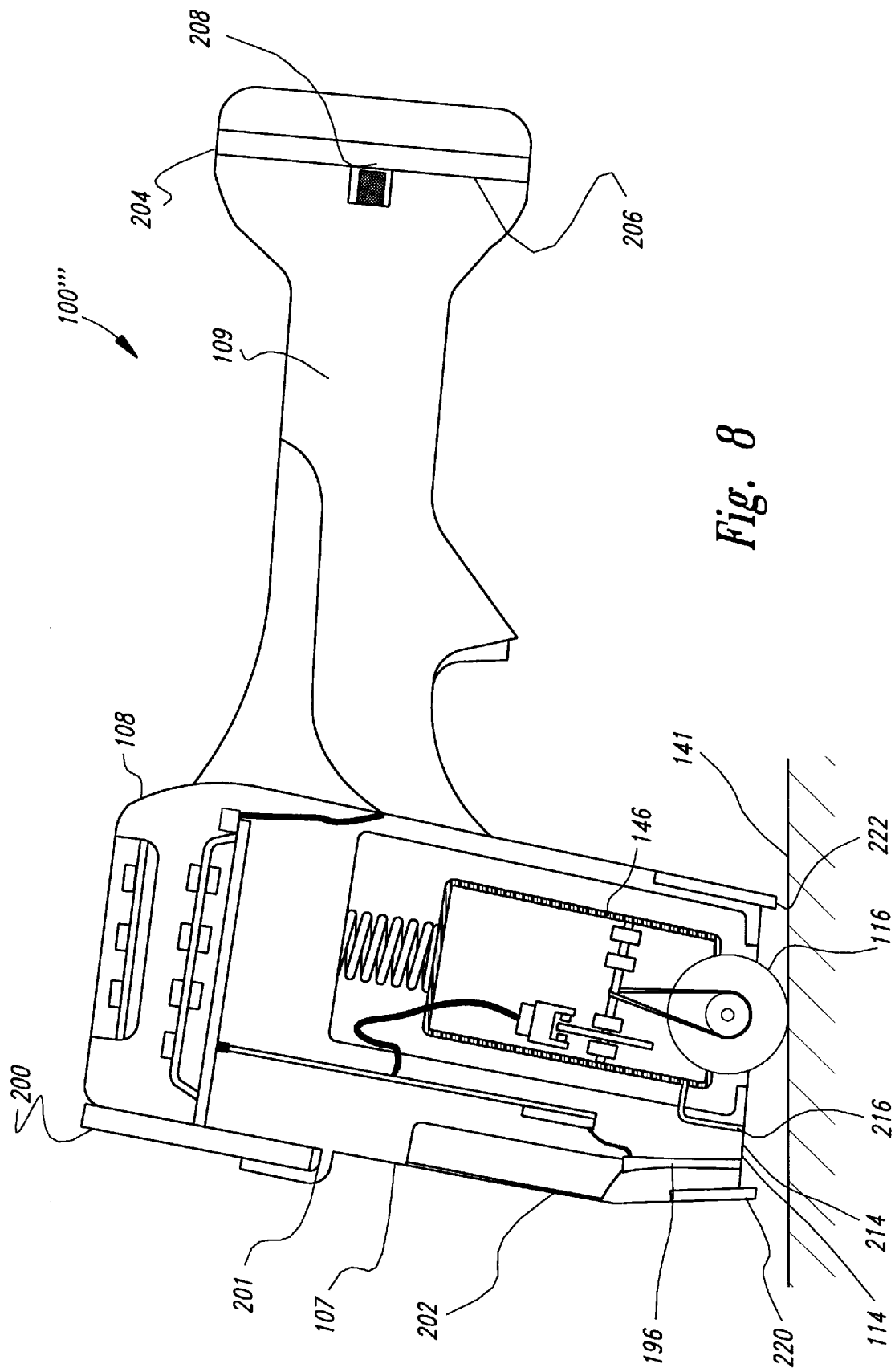
FIG. 8 is a cross-sectional side elevational view of a third alternative embodiment of the printer of FIG. 1.

Alternate forms of improving attraction of the printer 100 to the target object 141 may be employed for printing on certain types of materials. For example, in the third alternative embodiment of the printer 100''' illustrated in FIG. 8, magnetic attraction is utilized by positioning a pair of spaced apart magnets 220 and 222 along forward and rearward edges of the printing face 114. The magnets 220 and 222 attract ferrous and other magnetic material in, behind, or bonded to the target object 141 to create an attractive force to attract and help hold the printing face 114 parallel and adjacent to the target object for printing. The magnets are preferably fixed magnets. Where power consumption is not an important consideration, the magnets can be conventional electromagnets, enabling the magnetic attraction to be selectively utilized. In the case of electromagnets, the trigger button 130 and trigger switch 131 described above or an alternative user-activated means such as a magnet activation button may be used to activate the electromagnets.

It will be appreciated that, although specific embodiments of the invention have been described herein for purposes of illustration, various modifications may be made without departing from the spirit and scope of the invention. Accordingly, the invention is not limited except as by the appended claims.

We claim:

1. A mobile printer for printing an image in a printing field of a target object, the image being represented by bits of data, comprising:

a housing movable relative to the target object sequentially over portions of the printing field;

a printing member supported by the housing for printing in the printing field, the printing member having a maximum print area for a predetermined position of the housing relative to the target object substantially less than the entire area of the image to be printed;

an orientation selector for selecting one of a plurality of orientations in which the image is to be printed;

a position detector for detecting the position of the housing relative to the target object;

a memory containing the bits of data representing the image;

a printing member driver connected to receive information from the position detector, connected to control the printing member and connected to retrieve the bits of data from the memory, the printer member driver selectively activating the printing member to sequentially print portions of the image corresponding to the detected relative position of the housing as the housing is moved relative to the target object over the printing field, in response to the retrieved bits of data and in response to the selected one of the orientations; and a user activated trigger connected to a consent switch with the position detector such that the printer prints only upon actuation of the trigger and a change in the detected position.

2. A mobile printer for printing an image in a printing field of a target object, the image being represented by bits of data, comprising:

a housing movable relative to the target object sequentially over portions of the printing field;

a printing member supported by the housing for printing in the printing field, the printing member having a maximum print area for a predetermined position of the housing relative to the target object substantially less than the entire area of the image to be printed;

an orientation selector for selecting one of a plurality of orientations in which the image is to be printed;

a position detector for detecting the position of the housing relative to the target object;

a memory containing the bits of data representing the image; and a printing member driver connected to receive information from the position detector, connected to control the printing member and connected to retrieve the bits of data from the memory, the printer member driver selectively activating the printing member to sequentially print portions of the image corresponding to the detected relative position of the housing as the housing is moved relative to the target object over the printing field, in response to the retrieved bits of data and in response to the selected one of the orientations, and wherein the printing field includes a plurality of field portions and each portion of the image is formed from a single printline, each printline being printed in a respective one of the field portions, in response to the detected position of the housing further including a printline based scaling factor generator for determining a printline based scaling factor, wherein the printing member driver selects a number of times each of the image portion is repeated for successive field portions in response to the printline based scaling factor.

3. The printer of claim 2, further including a distance based scaling factor generator for determining a distance based scaling factor wherein the printing member driver scales the image by adjusting the distance between successive field portions.

4. The printer of claim 3, further including a comparator connected to the position detector to determine the distance traveled by the housing as the housing is moved relative to the printing field, wherein the scaling factor generator receives from the comparator data corresponding to the determined distance traveled by the housing for use by the scaling factor generator in determining the scaling factor.

5. A mobile printer for printing an image on a desired printing field of a target object, the printing field having a first end and a second end, comprising:

a first position being selected such that a printing member is aligned to the first end of the printing field when the housing is in the first position;

a housing carrying the printing member, the housing being movable relative to the target object to move the printing member sequentially over portions of the printing field;

a position detector operative to detect the position of the housing relative to a selected first position of the housing, the first position being selected such that the printing member is aligned to the first end of the printing field when the housing is in the first position and to determine an overall length of the printing field by comparing the selected position to a second position of the housing where the printing member is aligned to the second end of the printing field;

a memory containing data representative of the image;

a printing member supported by the housing for printing successive portions of the image position, said printing member having a maximum print area substantially less than the entire area of the image to be printed;

a printing member controller connected to retrieve the data from the memory and operative to determine which portion of the image to print in the printing field portion corresponding to the detected position of said housing based on the determined overall length of the printing field; and a printing member driver operative to activate the printing member in response to the portion of the image determined by the printing member controller.

6. The printer of claim 5, further including a first scaling factor generator for determining a first scaling factor, wherein the printing member driver adjusts the number of times each portion of the image is printed successively in response to the first scaling factor.

7. The printer of claim 5, further including a distance based scaling factor generator for determining a distance based scaling factor wherein the printing member driver scales the image by adjusting the distance between successive portions of the image.

8. The printer of claim 7 wherein the printing member controller is external to the housing and is coupled to the printing member driver using a remote transmission.

9. A method of printing an image on a target object using a printer having a movable housing supporting a printing member, comprising the steps of:

selecting a scaling factor N;

positioning the housing to place the printing member in a first printing position;

moving the housing to move the printing member from the first printing position to a plurality of successive printing positions;

detecting the location of each successive one of the plurality of successive printing positions relative to the first printing position;

determining what portion of the image is to be printed at the first printing location and each of the detected locations based on the scaling factor and the detected location; and activating the printing member in response to the determined portion of the image to be printed on the target object at the first printing location and each of the detected locations so as to successively print all portions of the image on the target object.

10. The method of claim 9 wherein the step of determining what portion of the image to print based on the scaling factor N includes repeating N times each portion of the image to be printed.

11. The method of claim 10 for use with a printer having a roller rotatably supported by the housing and frictionally engaged with the target object, wherein the step of detecting the location comprises detecting the angular rotation of the roller relative to the target object.

12. The method of claim 11 wherein the roller remains frictionally engaged with the target object during the steps of moving the housing, detecting the location and activating the printing member.

13. A method of printing an image in a printing field having a plurality of field portions on a target object using a printer having a movable housing supporting a printing member with a maximum printing area for a predetermined position of the housing relative to the target object substantially equal to the area of one of the field portions, the printing field having a predetermined width, comprising the steps of:

positioning the housing relative to the printing field to place the printing member in a first printing position;

measuring the length of the printing field by moving the housing over the printing field such that the printing member traverses a distance substantially equal to the length of the printing field and detecting the distance traversed by the printing member;

moving the housing relative to the printing field to move the printing member from the first printing position to a plurality of successive printing positions;

detecting the location of each successive one of the printing positions relative to the first printing position;

determining for each detected location a field portion of the printing field with which the printhead is aligned and a portion of the image corresponding to the determined field portion; and activating the printing member to selectively print in successive ones of the field portions the corresponding portion of the image in response to the detected location and the measured width of the printing field.

14. The method of claim 13 for use with a printer having a roller rotatably supported by the housing and frictionally engaged with the target object, wherein the step of detecting the location comprises detecting the angular rotation of the roller relative to the printing field.

15. The method of claim 14 wherein the image has an unscaled image size, further including the steps of:

determining a scaled image size corresponding to the measured width of the printing field;

determining a scaling factor S to scale the unscaled image to a scaled image; and determining for each detected location using the scaling factor S a portion of the scaled image corresponding to the determined field position.

16. The method of claim 15 wherein the image comprises a plurality of printlines and wherein the step of activating selecting a printline scaling a factor N, the printing member comprises the steps of:

repeating each successive one of the printlines N times; and reducing the spacing between successive printlines by a distance based scaling factor F where the scaling factor S is equal to the printline scaling factor N times the distance based scaling factor F.

* * * * *